United States Patent [19]

Olomski et al.

[11] Patent Number: 5,473,542
[45] Date of Patent: Dec. 5, 1995

[54] METHOD FOR A TIME-OPTIMAL, TRUE-TO-PATH BRAKING OF AXLE DRIVES OF NUMERICALLY CONTROLLED MACHINES

[75] Inventors: Jürgen Olomski, Herzogenaurach; Norbert Settele, Willprechtszell; Bernd Liepert, Meitingen, all of Germany

[73] Assignee: Siemens Aktiengesellschaft, München, Germany

[21] Appl. No.: 93,379

[22] Filed: Jul. 19, 1993

[30] Foreign Application Priority Data

Jul. 21, 1992 [EP] European Pat. Off. .............. 92112461

[51] Int. Cl.⁶ .................................................. G05B 19/00
[52] U.S. Cl. .................. 364/474.31; 364/474.3; 318/573
[58] Field of Search ............ 364/474.31, 474.3, 364/474.29, 474.28, 474.34, 474.35, 474.32; 318/571, 578, 573, 569, 362, 63, 64, 568.15, 570

[56] References Cited

U.S. PATENT DOCUMENTS

| 4,663,726 | 5/1987 | Chand et al. .................. 364/474.31 X |
| 4,804,893 | 2/1989 | Melocik ................................... 318/258 |
| 4,914,363 | 4/1990 | Stelzer et al. ...................... 364/474.3 X |
| 4,967,127 | 10/1990 | Ihiguro et al. ................... 364/474.03 X |
| 5,070,287 | 12/1991 | Boehm .............................. 364/474.3 X |
| 5,218,281 | 6/1993 | Sasaki et al. ..................... 364/474.3 X |
| 5,229,698 | 7/1993 | Minnich et al. ................. 364/474.31 X |

FOREIGN PATENT DOCUMENTS

| 0102219 | 3/1984 | European Pat. Off. . |
| 0439617 | 8/1991 | European Pat. Off. . |

Primary Examiner—Roy N. Envall, Jr.
Assistant Examiner—Brian C. Oakes
Attorney, Agent, or Firm—Kenyon & Kenyon

[57] ABSTRACT

After an emergency braking operation is released in the case of a numerically controlled machine, the path calculated by the interpolator continues to be traveled, so that braking takes place on this path in the interpolation clock cycle. To determine the braking-interpolation points ($P_{iB}$), a factor k is defined for each axle, which factor fulfills the condition of at least one axle being decelerated by a maximum amount and the remaining axles being decelerated more slowly.

12 Claims, 1 Drawing Sheet

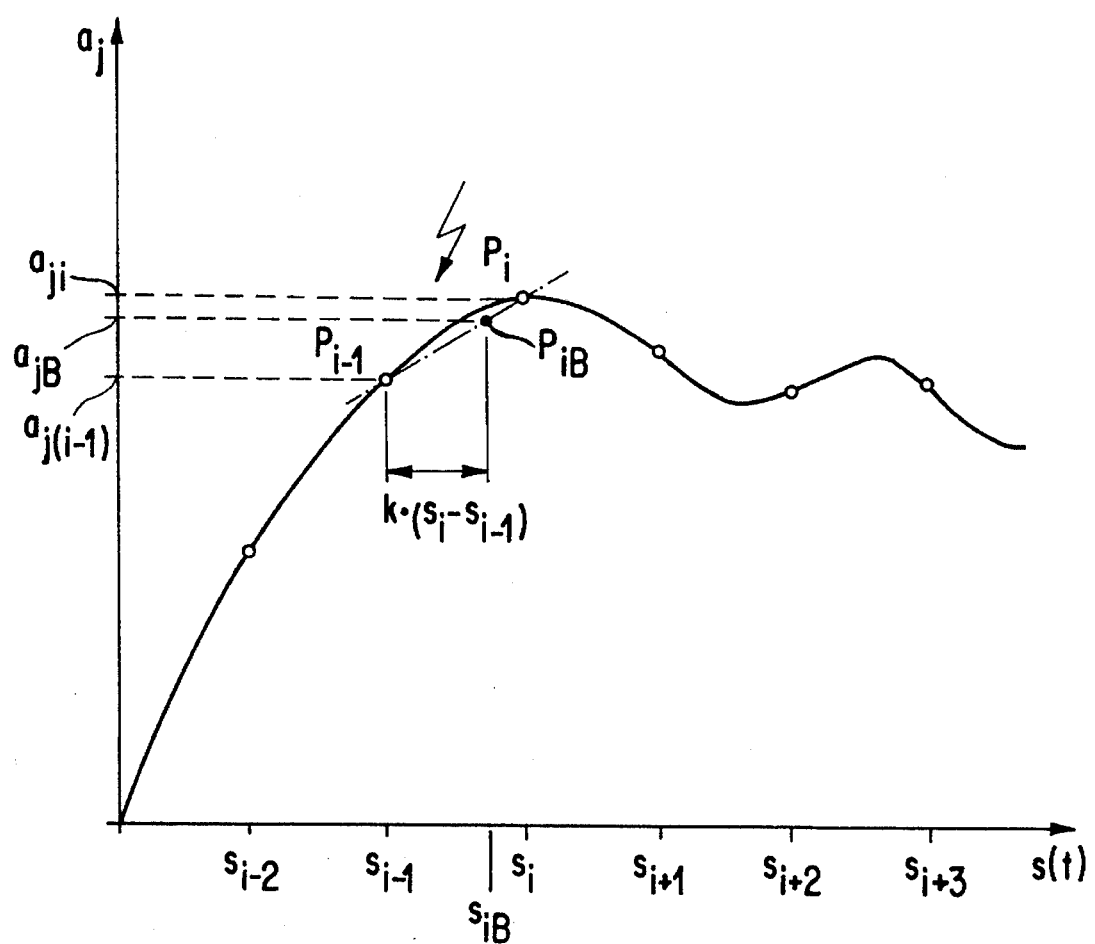

METHOD FOR A TIME-OPTIMAL, TRUE-TO-PATH BRAKING OF AXLE DRIVES OF NUMERICALLY CONTROLLED MACHINES

BACKGROUND OF THE INVENTION

When numerically controlled machines, particularly machine tools or robots, are subjected to dangerous situations, an emergency braking of the axle drives is provided which is either released by an EMERGENCY-STOP operator control, by external devices, or as the result of an internal error reaction. When such an emergency tripping takes place, the drives of the numerically controlled machine are supposed to be linearly decelerated in the shortest possible time through the appropriate selection of speed setpoints. About 30 to 50 milliseconds after the emergency tripping, a short-circuit braking which is necessary from a standpoint of safety engineering is then introduced so that, in any case, the motors come to a standstill while the control system is by-passed.

When such an emergency braking takes place, the numerically controlled machine can no longer adhere to the given tool path, since the axles are braked independently of one another. Even when the axle drives are synchronized to allow the axles to be adapted with respect to time to the axle exhibiting the lowest deceleration, path deviations occur, at least in the case of curved paths.

The least significant problem encountered in such an emergency braking operation is posed by the difficulties entailed in resuming the machining process. Far greater problems are encountered when a path deviation causes the tool to collide with the workpiece or with other objects or when, for example, several robots working side-by-side collide with one another.

SUMMARY OF THE INVENTION

The present invention relates to a method for a time-optimal, true-to-path braking of numerically controlled machines.

The method according to the present invention can be applied to all movements, in which the angular axial values are immediately available, such as in the case of a point-to-point movement. In this connection, the tool path is also understood to be the path covered by the tool in a point-to-point movement.

When the angular axial position is not directly known, but must first be calculated by transforming coordinates from another coordinate system, such as from a cartesian coordinate system, then one embodiment of the present invention provides for the interpolation and braking-interpolation points to be calculated in the non-axis-specific coordinate system, and then to be transformed into the axis-specific coordinate system to determine the deceleration of the axle drive.

To improve safety in case of an emergency braking, it is advantageous for the method to include a short-circuit braking introduced after a specified time span.

BRIEF DESCRIPTION OF THE DRAWINGS

One exemplified embodiment of the present invention will be clarified in greater detail in the following on the basis of the sole drawing, which depicts a diagram of an axial angular position of the axis over an interpolation parameter which is dependent upon time.

DETAILED DESCRIPTION

The FIGURE depicts the diagram of the angular axial position $a_j$ of the axis j over an interpolation parameter $s(t)$, which is dependent upon the time t. In the simplest case, the interpolation parameter $s(t)$ can be directly the time t, or it can be linked as an internal control system time (tau) to the time t. It is even conceivable to have the path length its an interpolation parameter $s(t)$. One skilled in the art may select this parameter, taking into consideration the particular control system.

The interpolator of a numerical control system calculates interpolation points P, which indicate the angular axial position $A=(a_1, a_2, \ldots, a_n)$ of all n axes in dependence upon the interpolation parameter $s(t)$. In the interpolation clock cycle i, the following equivalencies are supposed to apply:

$$t = t_i \qquad (1)$$

$$s(t_i) = s_i \qquad (2)$$

$$A(s_i) = A_i = (a_{1i}, a_{2i}, \ldots, a_{ni}) \qquad (3);$$

wherein $s_i$ and $A_i$ define the interpolation point $P_i$. The axle drives of a numerically controlled machine tool or of a robot are automatically controlled with these angular axial positions $A_i$, so that the tool in question travels along a predetermined path.

When an EMERGENCY-STOP signal exists between two interpolation points $P_{i-1}$, $P_i$ (indicated in the FIGURE by a lightning symbol), then a braking-interpolation point $P_{iB}$ is calculated, which lies between the preceding interpolation point $P_{i-1}$ and the interpolation point $P_i$, which would be calculated if no EMERGENCY-STOP signal existed. The braking-interpolation point $P_{iB}$ is calculated to allow the maximum possible braking acceleration (deceleration) to be applied for each axis. The braking-interpolation parameter $s_{iB}$ belonging to the braking-interpolation point $P_{iB}$ is supposed to lie thereby between $s_{i-1}$ and $s_i$ and be defined by k:

$$s_{iB} = s_{i-1} + k \cdot (s_i - s_{i-1}) \qquad (4)$$

For small interpolation intervals, the corresponding axial angular positions $A_{iB}$ are able to be determined accurately enough according to equation 5:

$$A_{iB} = A_{i-1} + k \cdot (A_i - A_{i-1}) \qquad (5)$$

Equation 5 may be applied directly in the case of a point-to-point movement, since the axial angular positions are able to be calculated immediately in the case of this movement. If the axial angular positions, such as in the case of a continuous-path movement, are not immediately available, then they must first be calculated from the existing geometric data, for example from the cartesian coordinates, by means of a coordinate transformation. Such coordinate transformations have previously been sufficiently disclosed, such that a more detailed description thereof has been omitted in this application for the sake of clarity of the description of the described embodiment.

Since, as a rule, in the case of numerically controlled machines, the maximum permissible braking acceleration $-(da^2/dt^2)_{max} = -\ddot{a}_{max}$ different for each axis, a separate optimum factor $k_j$ is initially calculated for each axis $a_j$:

$$-\ddot{a}_{max} = (a_j'(s_{i-1}) + k_j(a_j(s_i) - a_j(s_{i-1})) - 2 a_j(s_{i-1}) + a_j(s_{i-2}))/T^2_{ipo} \qquad (6);$$

wherein $T_{ipo}$ is the interpolation clock cycle time of the numerical control system.

From the n-factors $k_j$ (j=1 … n), the largest factor $k_j$ is selected, so that the axle j is braked with its maximum value and the remaining axles are not braked as heavily, which means the controlling axle, which establishes the deceleration, is axle j. If k becomes less than 0, standstill is reached and k is set to zero.

For this interpolation clock cycle, the thus determined axial angular positions $A_{iB}$, together with the corresponding parameter $s_{iB}$, replaces the axial angular positions $A_i$ and the parameter $s_i$ which had been calculated to begin with:

$$A_i := A_{iB} \quad (7)$$

$$s_i := s_{iB} \quad (8)$$

In each of the following interpolation clock cycles, the controlling axis is redefined, i.e., the described method must be implemented for each interpolation clock cycle, until the robot comes to a standstill or until a higher priority short-circuit braking is introduced.

When the safety aspects and regulations permit it, the time delay in which the converters of the numerically controlled system switch to short-circuit braking, should be adjusted so as to allow the mechanical system to come to a standstill under all circumstances in accordance with the described method, until the short-circuit braking begins. This is the case, for example, when the machine tool or the robot are used in automatic operation and a lockable protective gate is provided, which must then also be locked.

What is claimed is:

1. A method for a time-optimal, true-to-path braking of axle drives of numerically controlled machines, comprising steps of:

determining interpolation points of an angular axial position $A_i$ of said axle drives over an interpolation parameter (s(t)) by an interpolator of a numerical control system of the numerically controlled machines to move the axle drives;

calculating a braking-interpolation point when an emergency braking is released between two of said interpolation points, wherein a corresponding parameter value ($s_{iB}$) of the braking-interpolation point lies between a preceding interpolation-parameter value ($s_{i-1}$) and a succeeding interpolation-parameter value ($s_i$) which would have been calculated without an emergency braking, whereby the braking-interpolation parameter value ($s_{iB}$) and corresponding angular axial positions ($A_{iB}$) are calculated according to the following equations:

$$s_{iB} = s_{i-1} + k \cdot (s_i - s_{i-1}) \quad (1)$$

$$A_{iB} = A_{i-1} + k \cdot (A_i - A_{i-1}) \quad (2);$$

controlling true-to-path braking of said axle drives in response to said calculated braking-interpolation parameter value ($s_{iB}$) and corresponding angular axial positions ($A_{iB}$), wherein k is defined such that at least one axle drive is braked with a maximum permissible value and remaining axle drives are not braked as heavily; and implementing said calculating and controlling steps to determine each additional braking-interpolation point up until standstill of the axial movements, whereby according to the determination of equation (1) and (2) in each case, $s_i$ is replaced by $s_{iB}$ and $A_i$ is replaced by $A_{iB}$.

2. The method according to claim 1, whereby the interpolation points and braking-interpolation points are calculated in a non-axis-specific coordinate system, and then transformed into an axis-specific coordinate system to determine the deceleration of the axle drive.

3. The method according to claim 1, wherein a short-circuit braking is introduced after a specified time span.

4. The method according to claim 2, wherein a short-circuit braking is introduced after a specified time span.

5. The method according to claim 1, wherein said emergency braking is released by one of an operator control signal, an external device or as a result of an internal error reaction.

6. The method according to claim 5, wherein a short-circuit braking is introduced after a specified time span.

7. A method for a time-optimal, true-to-path braking of axle drives of numerically controlled machines, comprising steps of:

determining interpolation points of an angular axial position $A_i$ of said axle drives over an interpolation parameter (s(t)) by an interpolator of a numerical control system of the numerically controlled machines to move the axle drives;

calculating a braking-interpolation point when an emergency braking is released between two of said interpolation points, wherein a corresponding parameter value ($s_{iB}$) of the braking-interpolation point lies between a preceding interpolation-parameter value ($s_{i-1}$) and a succeeding interpolation-parameter value ($s_i$) which would have been calculated without an emergency braking, whereby the braking-interpolation parameter value ($s_{iB}$) and corresponding angular axial positions ($A_{iB}$) are calculated according to the following equations:

$$s_{iB} = s_{i-1} + k \cdot (s_i - s_{i-1}) \quad (1)$$

$$A_{iB} = A_{i-1} + k \cdot (A_i - A_{i-1}) \quad (2);$$

controlling true-to-path braking of said axle drives in response to said calculated braking-interpolation parameter value ($s_{iB}$) and corresponding angular axial positions ($A_{iB}$), wherein k is defined such that at least one axle drive is braked with a maximum permissible value and remaining axle drives are not braked as heavily, wherein for each angular axial position $a_j$ an optimal factor $k_j$ results which is related to the maximum permissible braking acceleration $-\ddot{a}_{max}$ according to the following equation:

$$-\ddot{a}_{max} = (a_j(s_{i-1}) + k_j(a_j(s_i) - a_j(s_{i-1})) - 2a_j(s_{i-1}) + a_j(s_{i-2}))/T^2_{ipo} \quad (3);$$

wherein $T_{ipo}$ is an interpolation clock time of the numerical control system; and implementing said calculating and controlling steps to determine each additional braking-interpolation point up until standstill of the axial movements, whereby according to the determination of equation (1) and (2) in each case, $s_i$ is replaced by $s_{iB}$ and $A_i$ is replaced by $A_{iB}$.

8. The method according to claim 7, whereby the interpolation points and braking-interpolation points are calculated in a non-axis-specific coordinate system, and then transformed into an axis-specific coordinate system to determine the deceleration of the axle drive.

9. The method according to claim 7, wherein a short-circuit braking is introduced after a specified time span.

10. The method according to claim 8, wherein a short-circuit braking is introduced after a specified time span.

11. The method according to claim 7, wherein said emergency braking is released by one of an operator control signal, an external device or as a result of an internal error reaction.

12. The method according to claim 11, wherein a short-circuit braking is introduced after a specified time span.

* * * * *